(12) United States Patent
Lund

(10) Patent No.: US 12,297,943 B2
(45) Date of Patent: May 13, 2025

(54) ADAPTER

(71) Applicant: JWL A/S, Hedensted (DK)

(72) Inventor: Niels Kristian Lund, Hedensted (DK)

(73) Assignee: JWL A/S, Hedensted (DK)

( * ) Notice: Subject to any disclaimer, the term of this patent is extended or adjusted under 35 U.S.C. 154(b) by 215 days.

(21) Appl. No.: 17/429,648

(22) PCT Filed: Feb. 11, 2020

(86) PCT No.: PCT/DK2020/050034
§ 371 (c)(1),
(2) Date: Aug. 10, 2021

(87) PCT Pub. No.: WO2020/164674
PCT Pub. Date: Aug. 20, 2020

(65) Prior Publication Data
US 2022/0120368 A1 Apr. 21, 2022

(30) Foreign Application Priority Data

Feb. 11, 2019 (DK) .......................... PA 2019 70096

(51) Int. Cl.
*F16L 37/06* (2006.01)
*F16L 37/22* (2006.01)
*F16L 37/40* (2006.01)

(52) U.S. Cl.
CPC ............... *F16L 37/06* (2013.01); *F16L 37/22* (2013.01); *F16L 37/40* (2013.01)

(58) Field of Classification Search
CPC ......... F16L 17/035; F16L 37/06; F16L 37/22; F16L 37/40
See application file for complete search history.

(56) References Cited

U.S. PATENT DOCUMENTS 1,913,982 A 12/1931 Fox
2,111,956 A * 3/1938 Baldwin ............. F16L 37/0927
220/240

(Continued)

FOREIGN PATENT DOCUMENTS

CH 553366 A 8/1974
DE 202018107206 U1 1/2019

(Continued)

*Primary Examiner* — Reinaldo Sanchez-Medina
(74) *Attorney, Agent, or Firm* — Cermak & McGowan LLP; Malcolm K. McGowan; James Creighton Wray

(57) ABSTRACT

Adapter suitable to connect a device for allowing compressed gas to pass through the adapter into an inflatable member, where the adapter comprises: —Means for attaching the adapter to a source of compressed gas, said means having a gas passage, and where the means for attaching the adapter is in gas communication with —A main housing, where the housing has an inner open-ended cavity, suitable to receive a valve body of the inflatable member, and where inside said open-ended cavity, a gas outlet is arranged, and further where means for releasably holding the valve body of the inflatable member is provided and further —A resilient gasket is provided surrounding the gas outlet, where in one end of the gasket towards the opening of the open-ended cavity is provided an engagement surface and in a lower section of the gasket opposite the engagement surface is provided a cavity, where the cavity is limited by an inner lip and an outer lip, where said inner lip is in sealing and sliding engagement with the gas outlet and the outer lip is in sealing and sliding engagement with the main housing, such that the cavity in the low-er end of the gasket creates a substantially gas tight chamber and where the gasket is further provided with a shoulder, and where a ridge is provided inside said open-ended cavity, where the open-ended cavity in a first cross-section perpendicular to the gas passage through the ridge has a smaller cross-sectional area of the gas passage (Continued)

than in a second cross-section adjacent the shoulder, such that the ridge limits the movement of the gasket in the gas passage's direction, and where the gas passage has a gas connection to the substantially gas tight chamber provided between the lower section of the gasket, and the housing.

9 Claims, 13 Drawing Sheets

(56) References Cited

U.S. PATENT DOCUMENTS

| | | | | |
|---|---|---|---|---|
| 2,135,222 | A * | 11/1938 | Scheiwer | F16L 37/42 285/259 |
| 2,265,267 | A * | 12/1941 | Cowles | F16L 37/42 285/379 |
| 2,860,893 | A * | 11/1958 | Clark | F16L 37/23 285/98 |
| 4,376,525 | A * | 3/1983 | Fremy | F16L 37/22 251/149.6 |
| 4,781,399 | A * | 11/1988 | Collon | F16L 17/035 285/8 |
| 5,205,568 | A * | 4/1993 | Stoll | F16J 15/3232 285/104 |
| 5,769,462 | A * | 6/1998 | Angell | F16L 37/22 285/308 |
| 7,938,456 | B2 * | 5/2011 | Chambaud | F16L 37/42 285/85 |
| 2002/0078754 | A1 | 6/2002 | Chen | |
| 2005/0000568 | A1 | 1/2005 | Nikolayev | |
| 2010/0181727 | A1 * | 7/2010 | Santi | F16L 17/02 285/332.2 |
| 2014/0261754 | A1 | 9/2014 | Wang | |
| 2014/0326345 | A1 | 11/2014 | Kuo | |
| 2017/0276278 | A1 | 9/2017 | Wang | |

FOREIGN PATENT DOCUMENTS

| | | |
|---|---|---|
| GB | 1363054 A | 8/1974 |
| GB | 2497163 A | 6/2013 |

* cited by examiner

SECTION G-G

SECTION B-B

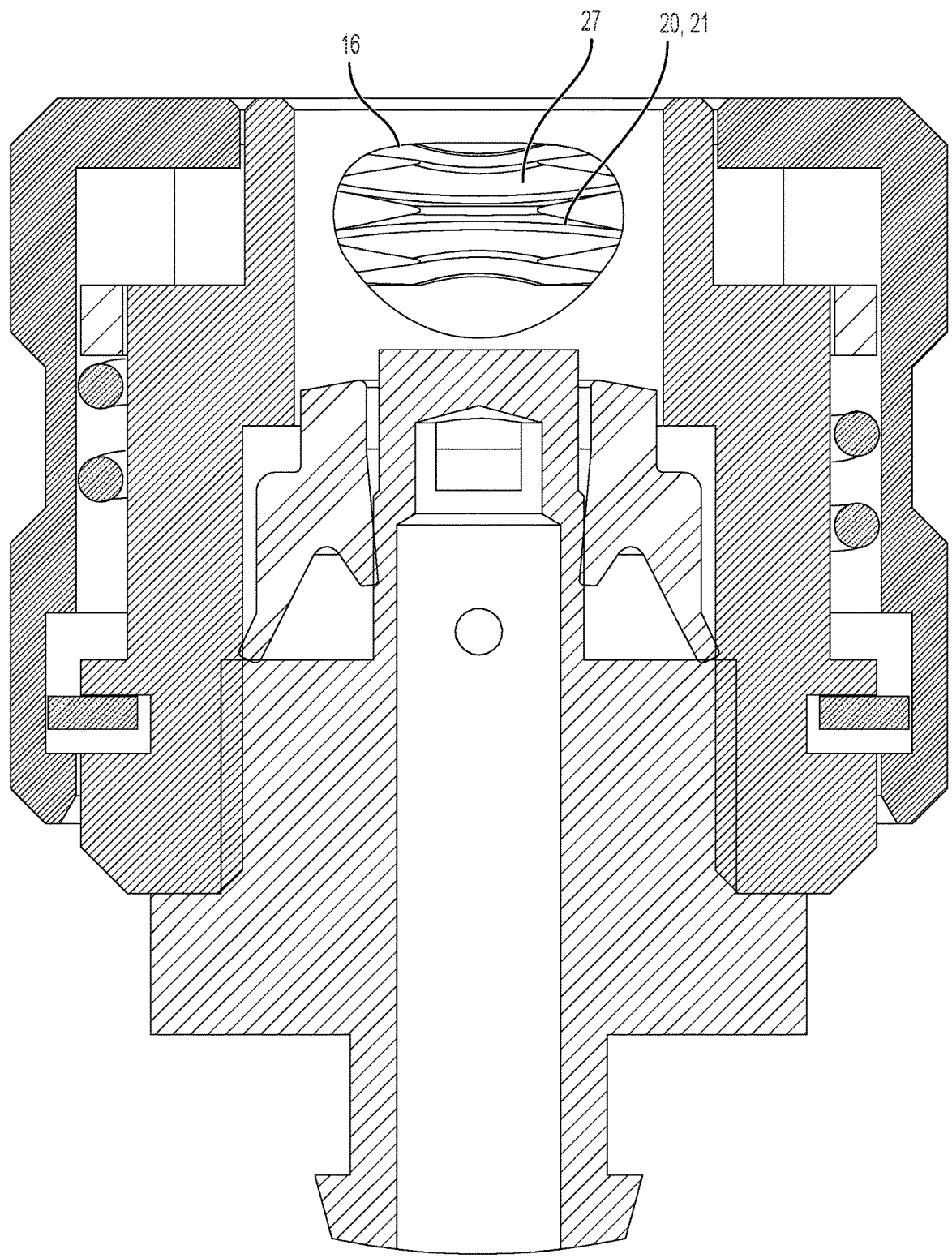
DETAIL C
SCALE 6:1
*FIG. 3 (CONT.-1)*

SECTION A-A

SECTION A-A

PRESSURIZED AIR GOES THROUGH HOLES IN THE "QT-VALVE ACTIVATOR STEM" AND THROUGH SCHRADER VALVE INTO TIRE. PRESSURIZED AIR ALSO GOES INTO THE CHAMBER BEHIND THE "VALVE SEALER" GASKET, AND KEEPS PRESSURE AGAINST SCHRADER VALVE END, AND THEREBY SECURES AN AIRTIGHT CONNECTION.

ADAPTER

This application claims the benefit of Danish Application No. PA 2019 70096 filed Feb. 11, 2019 and PCT/DK2020/050034 filed Feb. 11, 2020, International Publication No. WO 2020/164674 A1, which are hereby incorporated by reference in their entirety as if fully set forth herein.

FIELD OF THE INVENTION

The present invention relates to an adapter suitable to connect a device for allowing compressed gas to pass through the adapter into an inflatable member.

BACKGROUND OF THE INVENTION

Typically, adapters are designed to connect to a valve on an inflatable member such that by providing a gas pressure the inflatable member will be inflated by the gas. In everyday use this is particularly interesting when for example inflating tyres where it is desirable to inflate the tyre with air to a desired pressure.

A device for achieving this is disclosed in US2002/0078754 wherein a pressure gauge device is disclosed. The pressure gauge device is connected to a source of pressurized air. By operating the handle connected to an internal valve the air under-pressure may be led into a connection house which connection house is provided with an adapter suitable to connect the pressure gauge device to the valve on a car tyre. The adapter will typically have an opening corresponding to the diameter of the valve and have some type of locking device such that the adapter and thereby the pressure gauge device is effectively connected to the valve device of the tyre.

In this prior art example the connection is achieved by having a biased locking plate operated by a small leaver.

Often, these types of devices operate by attaching the adapter to the valve of the tyre whereby a manometer indicates the tyre pressure. At this stage the user may operate the handle in order to allow compressed air into the tyre or operate a relief valve in order to allow air out from the tyre in order to adjust the pressure.

Once the user assumes that enough air has been introduced or relieved from the tyre the relief valve or handle is released and a new reading is taken on the manometer. During this process as a consequence of the simple construction of the adapter, often driven by a requirement of low production cost, air will have a tendency to seep out in the interface between the adapter and the tyre valve. Naturally, this provides uncertainty for the user whether or not enough air has been introduced or relieved from the valve, and consequently either the tyre is left with a wrong air pressure or it takes an extraordinary long iterative process in order to achieve the correct tyre pressure.

A further example of an adapter construction is disclosed in U.S. Pat. No. 1,913,982. Although this document disclose a connection between an airline and a device and as such is not directed to adapters for used with tire valves, the invention according to U.S. Pat. No. 1,913,982 also addresses the issue of providing an airtight connection between an adapter and a valve stem. The valve stem is connected to the adapter by means of a bayonet connection. As the valve stem is inserted it engages a valve piston, which is raised from a valve seat, thereby allowing air to proceed to the valve stem. Part of the air is diverted into a chamber surrounding the upper part of the valve stem. In this chamber is located a gasket, which under the influence of air will expand and tighten against the valve, thereby minimizing the risk of air leak.

OBJECT OF THE INVENTION

Consequently there is a need for an adapter which creates a very tight-fitting and substantially air-tight connection between the device supplying compressed gas, for example air, and the inflatable member, for example a car tyre.

DESCRIPTION OF THE INVENTION

The invention addresses this by providing an adapter suitable to connect a device for allowing compressed gas to pass through the adapter into an inflatable member, where the adapter comprises:

Means for attaching the adapter to a source of compressed gas, said means having a gas passage, and where the means for attaching the adapter is in gas communication with A main housing, where the housing has an inner open-ended cavity, suitable to receive a valve body of the inflatable member, and where inside said open-ended cavity, a gas outlet is arranged, and further where means for releasably holding the valve body of the inflatable member is provided and further A resilient gasket is provided in a cavity between the housing and the gas passage near the gas outlet, where in one end of the gasket towards the opening of the open-ended cavity is provided an engagement surface suitable for engagement of a valve body of the inflatable member, where when a valve body of the inflatable member is inserted into the open ended cavity, the gasket is engaged, and the gasket is further moved relative to the housing such that the gasket will surround the valve body of the inflatable member.

In a particular embodiment of the invention as set out in a further advantageous embodiment the resilient gasket is provided surrounding the gas outlet, where in one end of the gasket towards the opening of the open-ended cavity is provided an engagement surface and in a lower section of the gasket opposite the engagement surface is provided a cavity, where the cavity is limited by an inner lip and an outer lip, where said inner lip is in sealing and sliding engagement with the gas outlet and the outer lip is in sealing and sliding engagement with the main housing, such that the cavity in the lower end of the gasket creates a substantially gas tight chamber and where the gasket is further provided with a shoulder, and where a ridge is provided inside said open-ended cavity, where the open-ended cavity in a first cross-section perpendicular to the gas passage through the ridge has a smaller cross-sectional area of the gas passage than in a second cross-section adjacent the shoulder, such that the ridge limits the movement of the gasket in the gas passage's direction, and where the gas passage has a gas connection to the substantially gas tight chamber provided between the lower section of the gasket, and the housing.

Once the valve has been inserted in the open-ended cavity it is held by the means for releasably holding the valve body inside the open-ended cavity. As compressed air is led through the gas passage the gas connection provided between the gas passage and the chamber delimited by the housing and the resilient gasket will cause the gasket to move upwards in the open-ended cavity thereby coming into contact with the valve of the inflatable member.

As the gasket is made from a resilient material it will create a substantially air-tight connection between the rim of the valve device inserted into the open-ended cavity and the adapter according to the present invention. In this position air is led into the inflatable member through the valve without air loss in the connection whereby it becomes possible to measure the correct air pressure both in the inflatable member and in the gas passage such that a correct and precise air pressure may be provided in the inflatable member.

At least within this application "gas-tight", "sealed" or any other such related term, shall be understood as sufficiently tight such that gas/air loss is negligible for the particular purpose. It is clear that with the tolerances of air pressure for most vehicles a few micro bars difference is allowable, and as such "gas tight" shall be seen and understood in the light of the use of the present invention.

In a further alternative embodiment, directed to a different type of valve member and inflation principle the gasket is provided in the gas passage adjacent the gas outlet, where a groove is provided in an inner wall of the cavity, and the gasket has a first lip inserted and held in said groove, and a second lip spaced from said first lip, where said second lip can slide on the inner wall, such that as a valve member of an inflatable body is inserted into the open ended cavity, the second lip will slide towards the first lip, thereby deforming the gasket, such that the gasket comes into sealing contact with the valve member of an inflatable body.

In this embodiment the gasket is deformed in such a manner that due to its ring shape, the gasket will surround and embrace the valve body. The more the valve body is inserted the stronger the embrace. At the same time the valve member will not activate the gas opening but there will be established a cavity including the gas outlet opening, such that the gas may freely pass into the inflatable member. At the same time the gasket will create a tight seal.

In a further advantageous embodiment of the invention the means for releasably holding the valve body of the inflatable member comprises two rollers arranged in parallel tangentially on opposite sides and adjacent the opening of the open-ended cavity, where said rollers are arranged in slits arranged at an oblique angle relative to the direction of the gas passage, allowing the rollers to move from an engagement position where the rollers in use are in engagement with the valve of the inflatable member, to a retracted position wherein the rollers are substantially outside the circumference of the open-ended cavity, and where the rollers are biased towards the engagement position by resilient means.

The rollers are arranged in slits which allow the rollers to move away from the open-ended cavity and into the open-ended cavity. Consequently, when inserting a valve of a member to be inflated into the open-ended cavity the valve may push the rollers away, but by providing a bias, for example in the shape of resilient means or springs it is possible to urge the rollers into engagement with the valve of the inflatable member thereby retaining the valve inside the open-ended cavity.

In order to create the substantially air-tight connection between the resilient gasket and the rim of the valve of the inflatable member it is important to retain the valve substantially fixed inside the open-ended cavity in order for the gasket to create the substantially air-tight connection. The rollers will retain the valve. Furthermore, as the rollers are urged by for example spring means and operate in slits arranged at an oblique angle relative to the gas passage, it is possible to adapt the holding according to tolerances on the inflatable device valve such that various valve diameters may be held in the adapter according to the invention due to the movability of the rollers relative to the open-ended cavity.

Naturally, the dimensions of the valve suitable for use with any given adapter must necessarily have a diameter of the rim which will fit against the engagement surface provided on the gasket.

In a further advantageous embodiment of the invention the means for releasably holding the valve body of the inflatable member comprises two rollers arranged in parallel tangentially on opposite sides and adjacent the opening of the open-ended cavity, where said rollers are arranged in slits arranged at an oblique angle relative to the direction of the gas passage, and where the rollers are provided with ridges substantially evenly spaced parallel to the longitudinal direction of the rollers on the periphery, said ridges spanning at least a major portion of the longitudinal extent of the rollers.

In this embodiment the rollers are provided with longitudinal ridges where the ridges may advantageously be provided with a sharp edge such that the rollers are able to grip and hold the inserted valve of the inflatable device securely.

Particularly for valves on tyres these are often provided with an outside thread in order to be able to hold a cap. When removing the cap the thread is exposed which means that the ridges on the rollers are able to engage the thread and thereby create a very fixed and firm hold on the valve during operation of the adapter according to the present invention.

In a still further advantageous embodiment the rollers have a circular cross-section, and the slits have an opening facing the gas passageway which is smaller than the diameter of the rollers.

By providing an opening facing the gas passageway which is smaller than the diameter of the rollers it is ensured that the rollers do not fall out of the adapter.

As will be illustrated below with reference to the detailed description of particular embodiments the rollers have an extent which is longer than the diameter of the opening and the gas passage, and as such it is possible to retain the rollers in both ends of the rollers in these oblique slits having an opening smaller than the diameter of the rollers as such.

In this manner the rollers are securely held and the construction for holding the rollers does not interfere with the open-ended cavity and thereby with the proper operation of the adapter.

In a further advantageous embodiment the main housing is assembled from two or more metal parts, which parts are screwed, soldered or welded together. By using metal parts a very sturdy construction is achieved and at the same time by having multiple parts it becomes possible to work the parts before being assembled such that undercuts and cavities may be provided in the finished adapter, for example a cavity suitable to house the gasket which will also be elaborated below with reference to the accompanying drawing.

DESCRIPTION OF THE DRAWING

The invention will now be described with reference to the accompanying drawings in which.

DETAILED DESCRIPTION OF THE INVENTION

Figure 1:
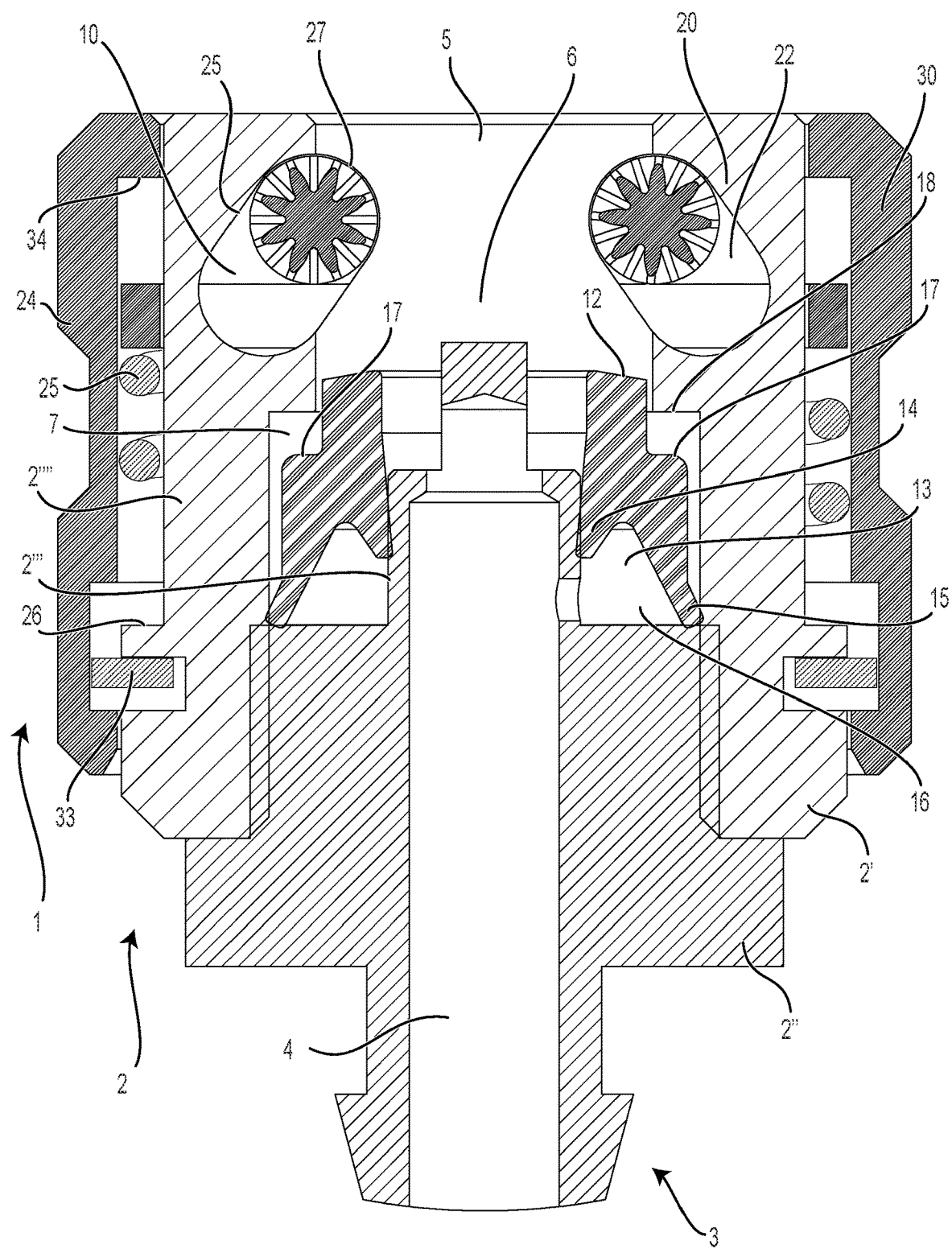
FIG. 1 illustrates a cross-section through an embodiment of the invention

In FIG. 1 is illustrated a cross-section through an embodiment of the invention. The adapter 1 is suitable to allow compressed gas, in particular air, into a valve allowing an inflatable device to be inflated. The valve as well as the inflatable device is not illustrated.

The adapter 1 comprises a main housing 2 which in this embodiment is assembled from two separate parts 2', 2". In a lower part of the housing 2 is provided a spigot or pipe-like connection piece 3, such that the adapter may be connected to a hose for supplying pressurized gas. Through the housing is provided a gas passage 4 such that the compressed gas may be led to the valve.

In the opposite end of the adapter 1 is provided an open-ended cavity 5 which cavity is suitable to receive and accommodate a valve device from a member to be inflated. Inside the open-ended cavity 5 is provided a gas outlet 6 as well as means 10 for releasably holding the valve body of the inflatable member.

Inside the open-ended cavity and being part of the gas outlet 6 is a resilient gasket 11. In a first end of the resilient gasket 11 is provided and engagement surface 12 which is suitable to engage a rim of the valve device during use and thereby create a substantially air-tight connection between the adapter 1 and the valve device.

In an opposite end of the gasket 11 is provided a cavity 13 which cavity 13 is limited by an inner lip 14 and an outer lip 15. The gasket 11 is provided in a cavity 7 provided between the housing 2 and the gas passage 4. The cavity has a size such that the gasket 11 may move in the direction of the gas passage 4.

The inner lip 14 and the outer lip 15 are designed such that the inner lip 14 will be in sealing engagement with a projecting part 2''' of the housing and the outer lip 15 will be in sealing engagement with an outer part of the housing 2''''. In this manner the cavity 13 is a substantially closed cavity. From the air passage 4 is provided a gas connection 16 such that gas introduced into the gas passage 4 may/will travel into the cavity 13 thereby urging the gasket 11 upwards. In order to stop the movement of the gasket, the gasket is provided with a shoulder 17 which shoulder 17 will engage another shoulder 18 on the housing, limiting the movement of the gasket. In this manner, when the adapter is to be used and a valve is inserted into the open-ended cavity 5 the rim of the open-ended valve will come into contact with the engagement surface 12 of the gasket. At the same time the means for retaining the valve 10 inside the open-ended cavity will be activated such that the valve cannot be retrieved from the open-ended cavity 5.

When compressed gas/air is led into the gas passage 4 the gas connection 16 will cause the gas to flow into the cavity 13. Thereby the gasket 11 will be pushed forward and the engagement surface 12 due to the resilient characteristics of the gasket will engage the rim of the inserted valve in a substantially gas tight manner. In this manner no leakage will occur when gas is transferred from the gas passage to the inflatable member.

In this embodiment the means for releasably holding the valve body of the inflatable member comprises two parallel rollers 20, 21. The rollers 20, 21 are arranged in slits 22, 23 which are arranged at an oblique angle relative to the direction of the gas passage 4. Furthermore, the rollers 20, 21 are urged into the position illustrated in FIG. 1 by a washer 24. The washer is urged upwards against the rollers 20, 21 by a spring member 25 which spring member is arranged concentrically around the housing 2' and limited upwards by the washer 24 and downwards by a shoulder 26 provided on the housing. Consequently, when the rollers 20, 21 are being influenced by inserting a valve into the open-ended cavity 5 the rollers will be urged downwards into the oblique slits 22, 23 and thereby allowing a larger cross-section in the open-ended section than the distance between the rollers 20, 21 in the position illustrated in FIG. 1, at the same time compressing the spring member 25.

As the rollers are urged downwards the washer 24 is like-wise urged downwards thereby compressing the helical spring 25. Once the movement of the inserted valve stops, the spring member 25 urging the washer and thereby the rollers 20, 21 into engagement with the valve will hinder the valve member in being moved out of the open-ended cavity 5.

However, once the inflatable member has been inflated to the desired air pressure it is desirable to remove the valve from the adapter and for this purpose a release ring 30 is provided externally on the housing and circumscribing substantially the entire housing. The release spring 30 is movable in the direction of the gas passage 4 such that a release shoulder 31 under release ring 30 may be brought downwards and into contact with the washer 24. By urging the release spring 30 further downwards the washer 24 will compress the spring member 25 thereby allowing the rollers 20, 21 to fall back into the slits 22, 23 whereby the engagement with the inserted valve is released and the valve may be removed from the adapter 1. In order to retain the release spring 30 on the housing a locking ring 33 is provided such that the release ring will be retained in place.

In this embodiment the rollers 20, 21 are provided with ridges 27. Typically these types of adapters are used for inflating car tyres and a typical valve used for car tyres has a threaded end on which a cap member may be screwed onto the valve in order to protect the valve from dust, dirt and debris. Once the cap is removed, the inner part of the valve is exposed, but at the same time the thread provided on the outer side of the valve is also exposed. By inserting the valve and thereby the thread into the open-ended cavity 5 of the present invention the ridges 27 provided on the rollers 20, 21 will engage the thread and thereby improve the retaining of the valve inside the open-ended cavity.

Figure 2:
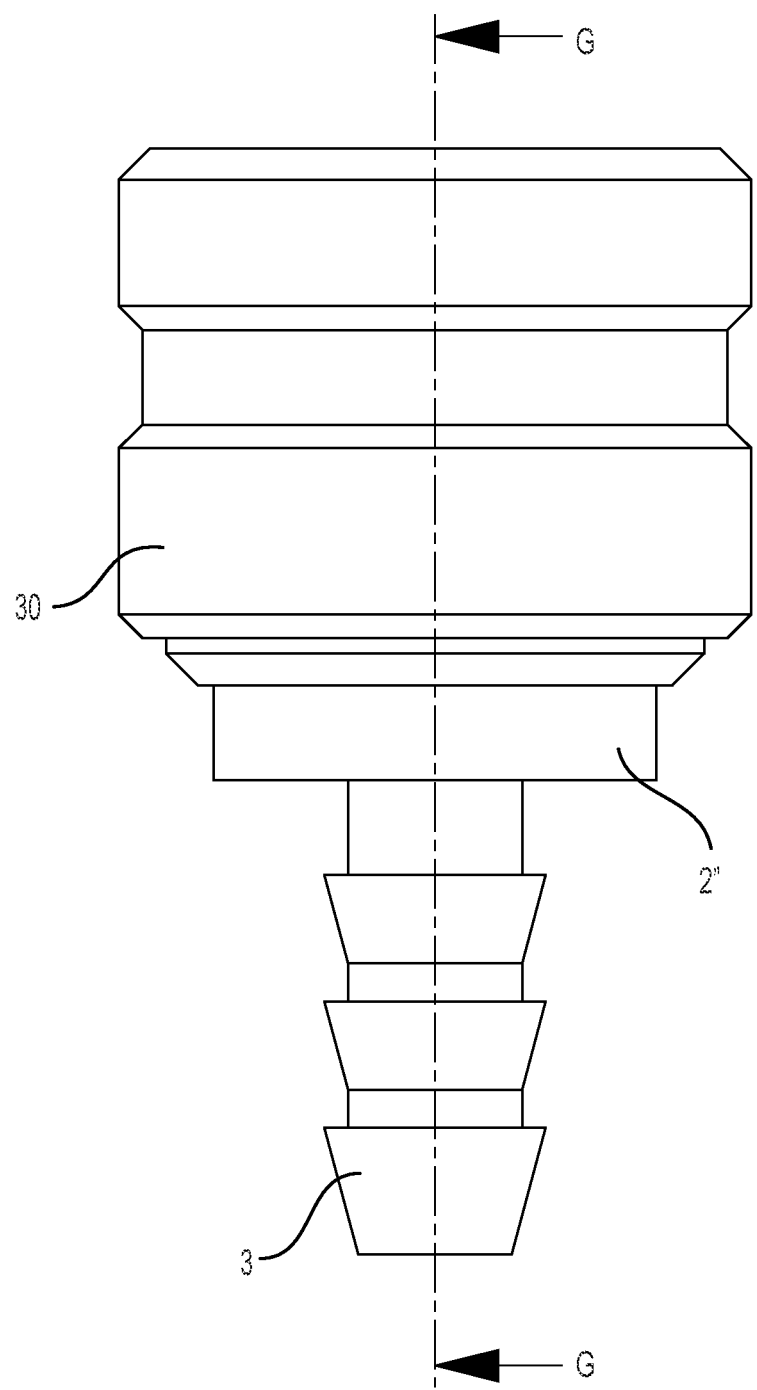
FIG. 2 illustrates an adapter according to the present invention
Figure 2:
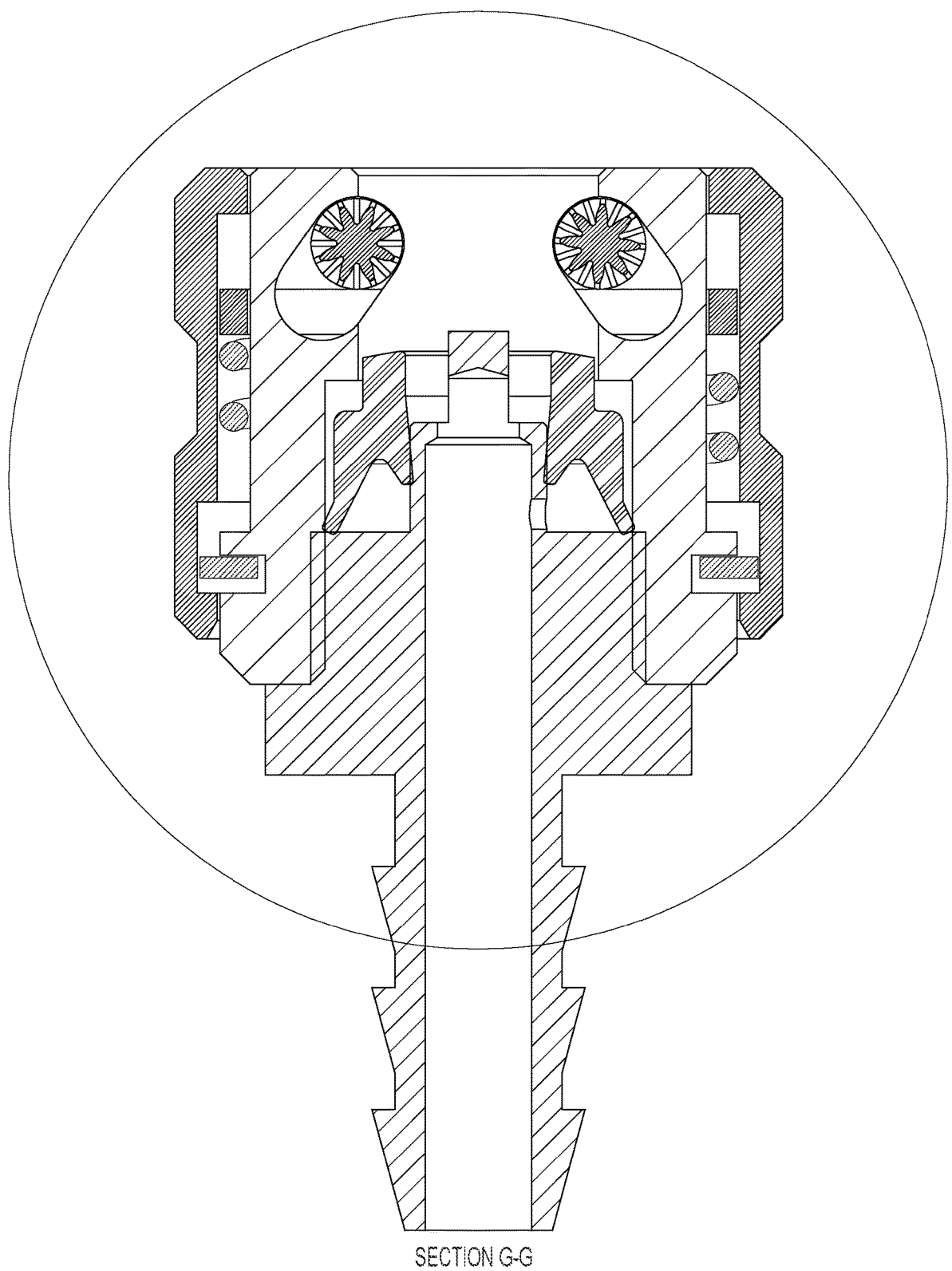

In FIG. 2 is illustrated an adapter according to the present invention where the connection 3 for connecting to a hose of compressed air is part of the housing 2" and the release ring is visible.

Figure 3:
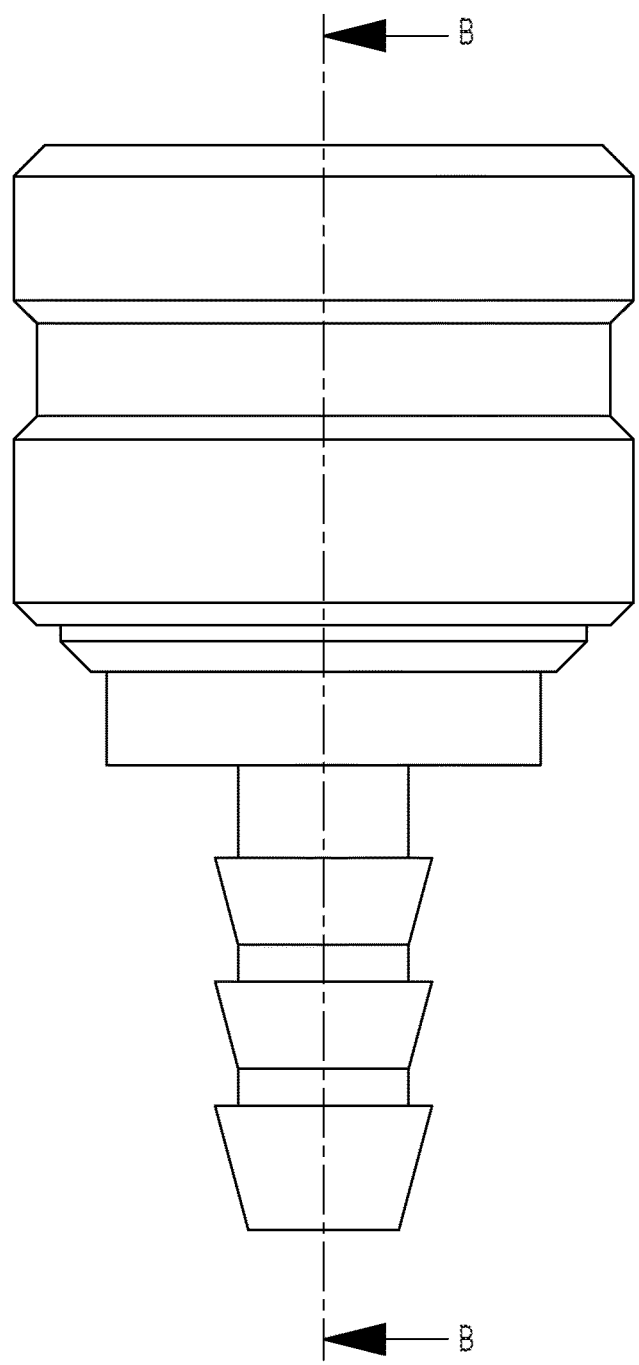
FIG. 3 illustrates a cross-section in a direction perpendicular to the cross-section in FIG. 1
Figure 3:
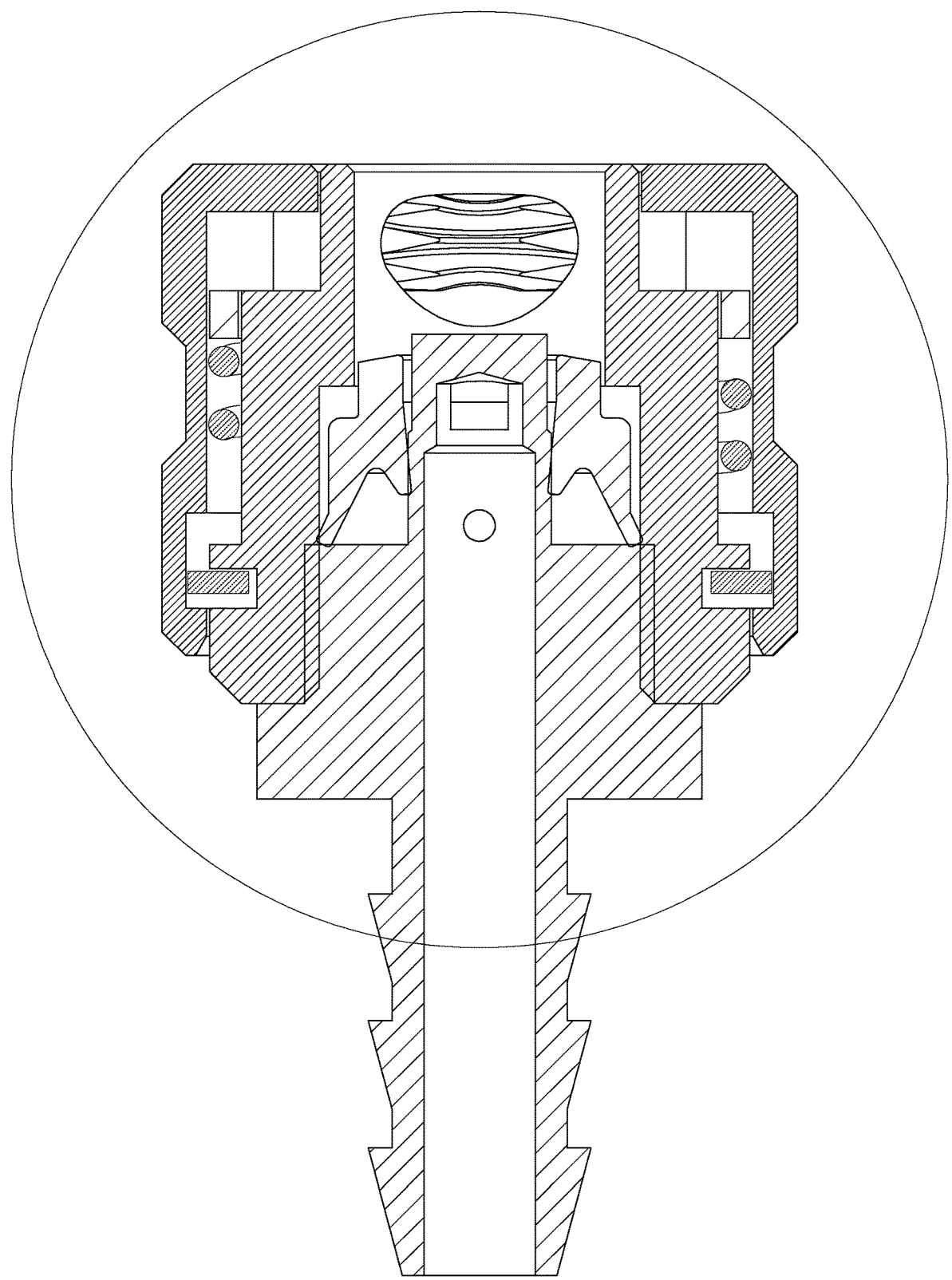

In FIG. 3 is illustrated a cross-section in a direction perpendicular to the cross-section in FIG. 1 where particularly the ridges 27 on the rollers 20 may be seen through the slit 19.

Figure 4:
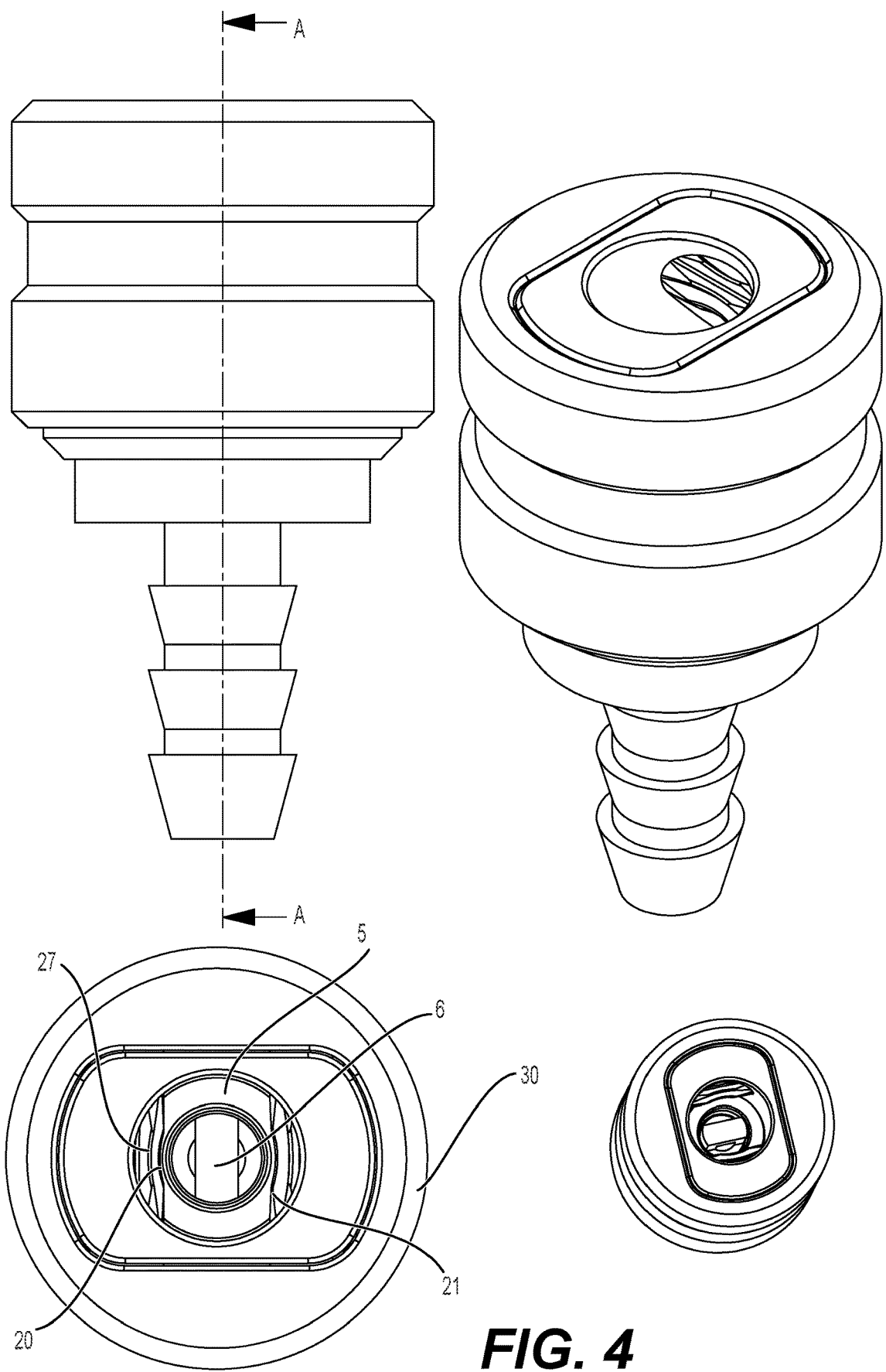
FIG. 4 illustrates an adapter as seen from the front
Figure 4:
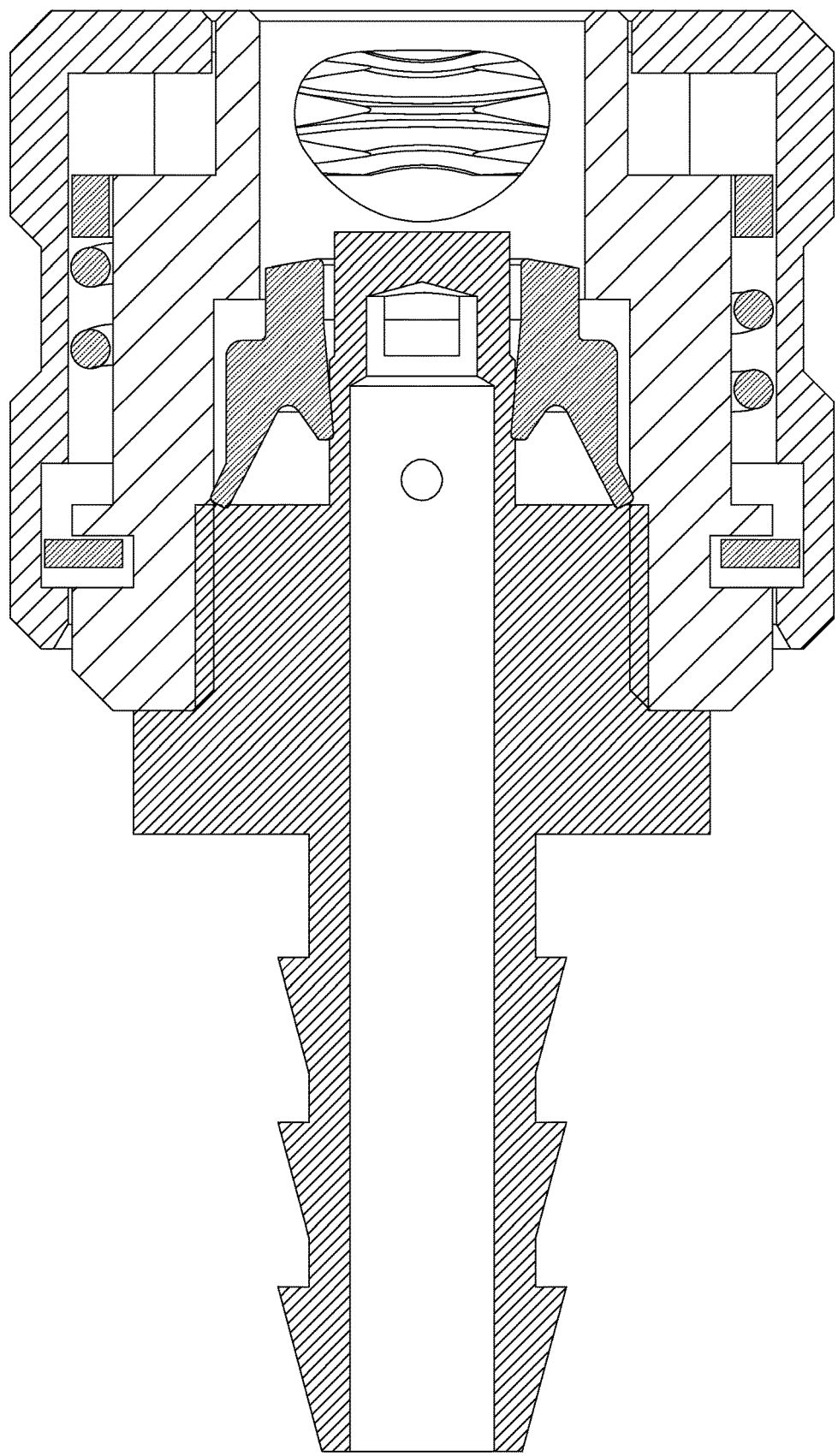

In FIG. 4 is illustrated an adapter as seen from the front. Centrally the open-ended cavity 5 is visible and inside the gas outlet 6. Surrounding the opening of the open-ended cavity 5 is the release ring 30. Furthermore the ridges 27 of the rollers 20, 21 may be seen through the opening in the open ended cavity.

Figure 5:
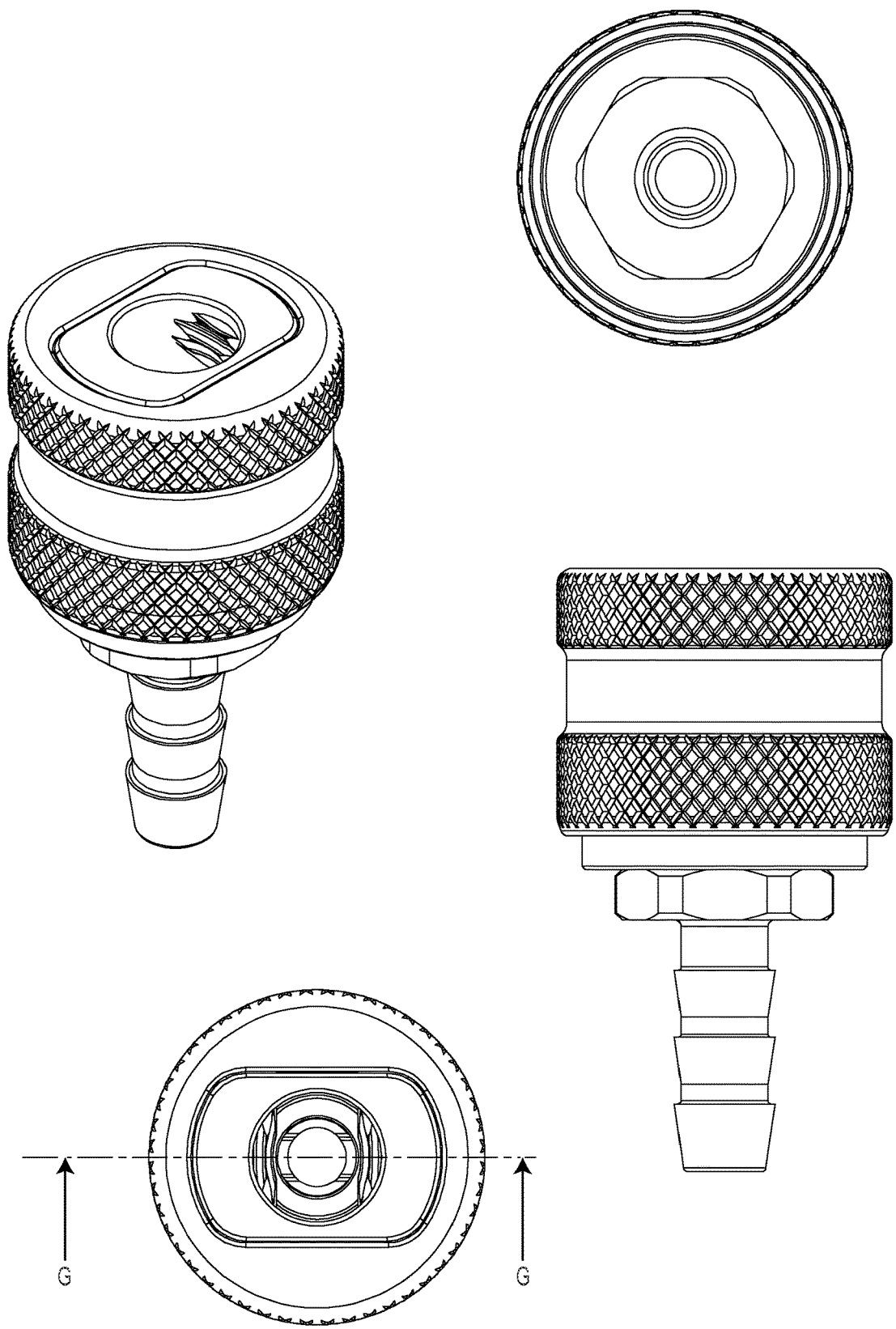
FIG. 5 illustrates an alternative embodiment of the invention
Figure 5:
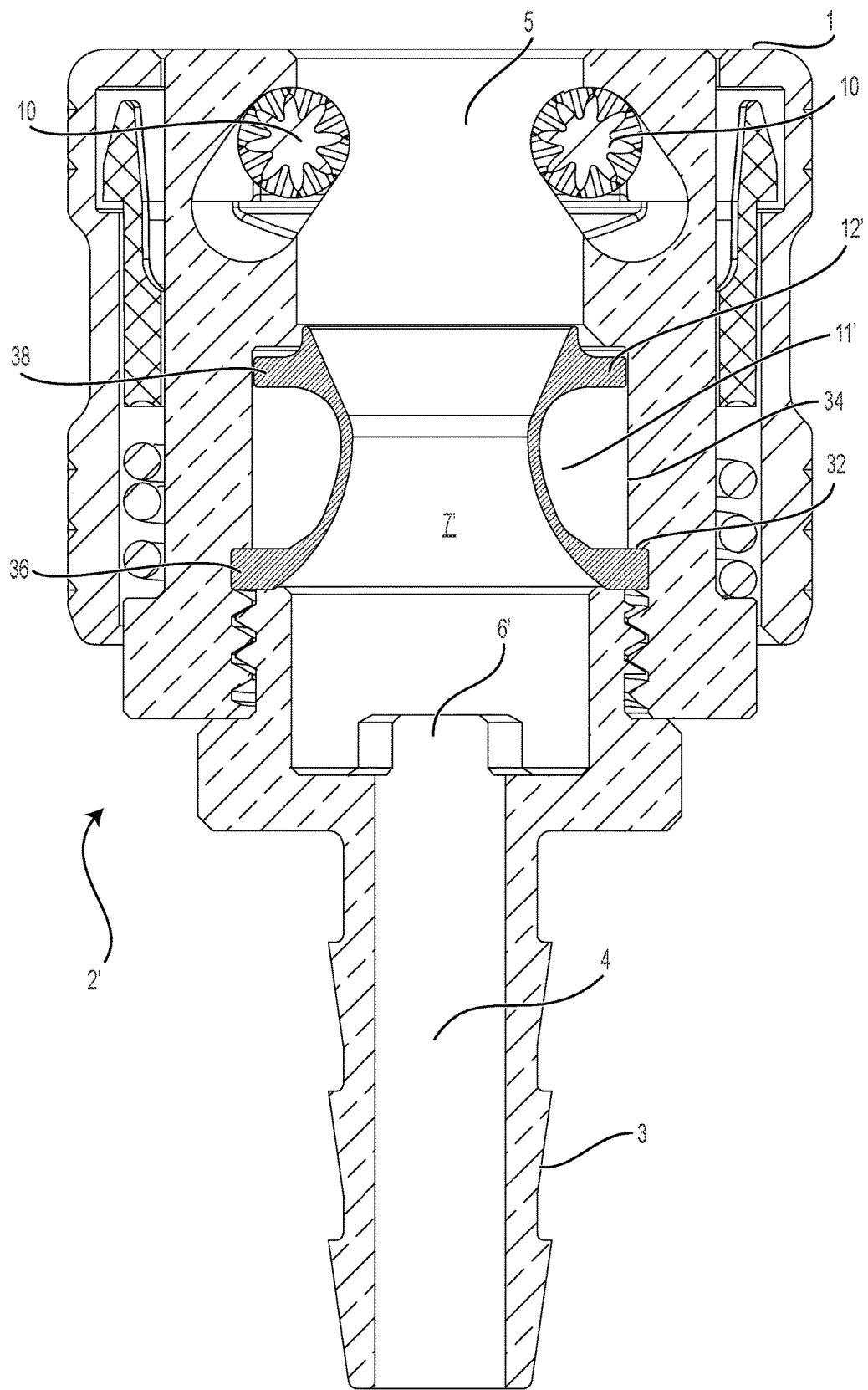

In FIG. 5 is illustrated an alternative embodiment of the invention wherein the adaptor 1 is provided with a different gasket construction as will be explained.

The adaptor 1 has a housing 2' surrounding an open-ended cavity 5'. The open-ended cavity 5' is in communication with the gas passage 4 provided in the means for connecting the adaptor 1 to a source of pressurized gas. In this embodiment the means 3 is in the shape of a spigot or pipe-like connection piece.

Figure 6:
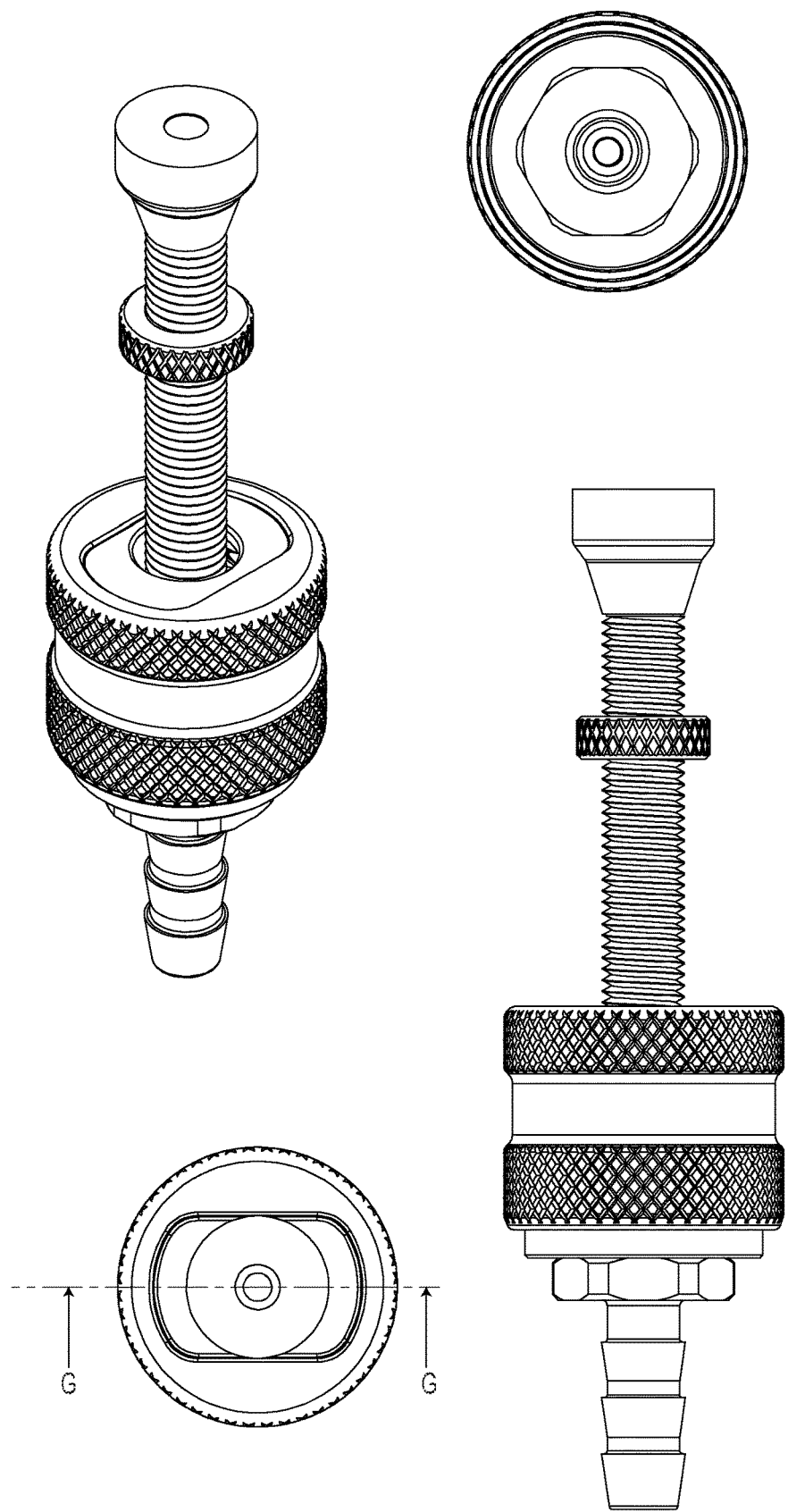
FIG. 6 illustrates a sliding movement initiated by inserting a valve member into the open-ended cavity FIG. 7 illustrate a cross-section through an embodiment of the invention
Figure 6:
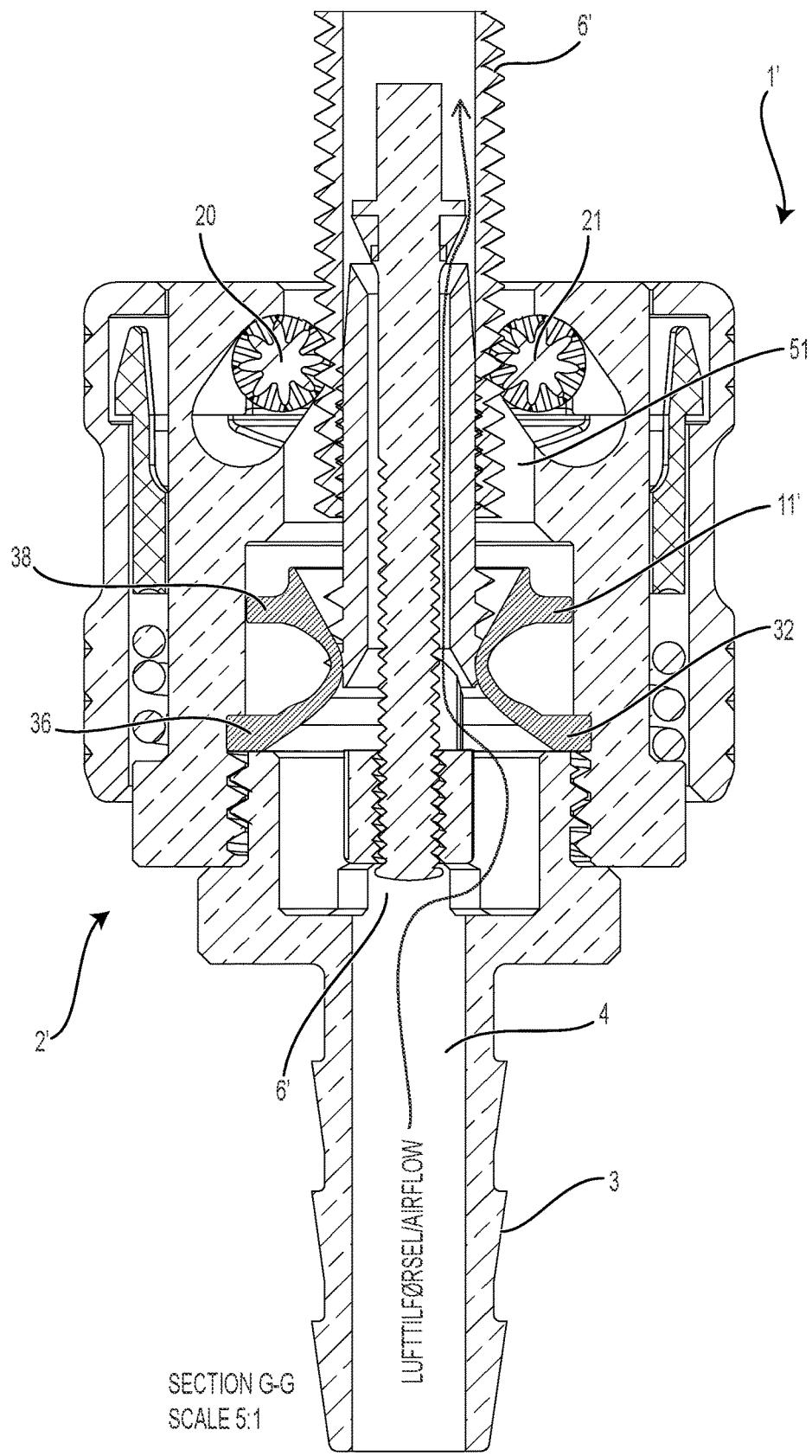

The gasket 11' is arranged surrounding a cavity 7'. The gasket 11' has a first lip 36 which is inserted and held in a groove 32 provided in an inner wall 34 of the main body 2'. In the opposite end of the gasket 11' is provided a second lip 38 which second lip is in contact with the inner wall 34 of the cavity 7' such that the second lip 38 may slide in the direction of intended gas passage through the adaptor. This sliding movement is as will be explained with reference to FIG. 6 initiated by inserting a valve member 50 into the open-ended cavity 5' whereby the valve 50 engages the gasket 11' and forces the gasket downwards. During this movement the first lip 36 is fixed in the groove 32 and will therefore not move whereas the second lip 38 will move downwards.

At the same time, due to the relative movement of the lips 36, 38 coming into closer relationship the gasket 11' will bulge thereby creating an intimate embrace of the valve member 50 such that a substantially airtight connection is created between the gasket 11' and the valve member 50. At the same time the gas outlet 6 allows gas to pass by part of the valve member 50 and into the inflatable body (not illustrated).

The valve 50 is fixed by the means 10 in this embodiment comprising rollers 20, 21 as already explained above.

Figure 7:
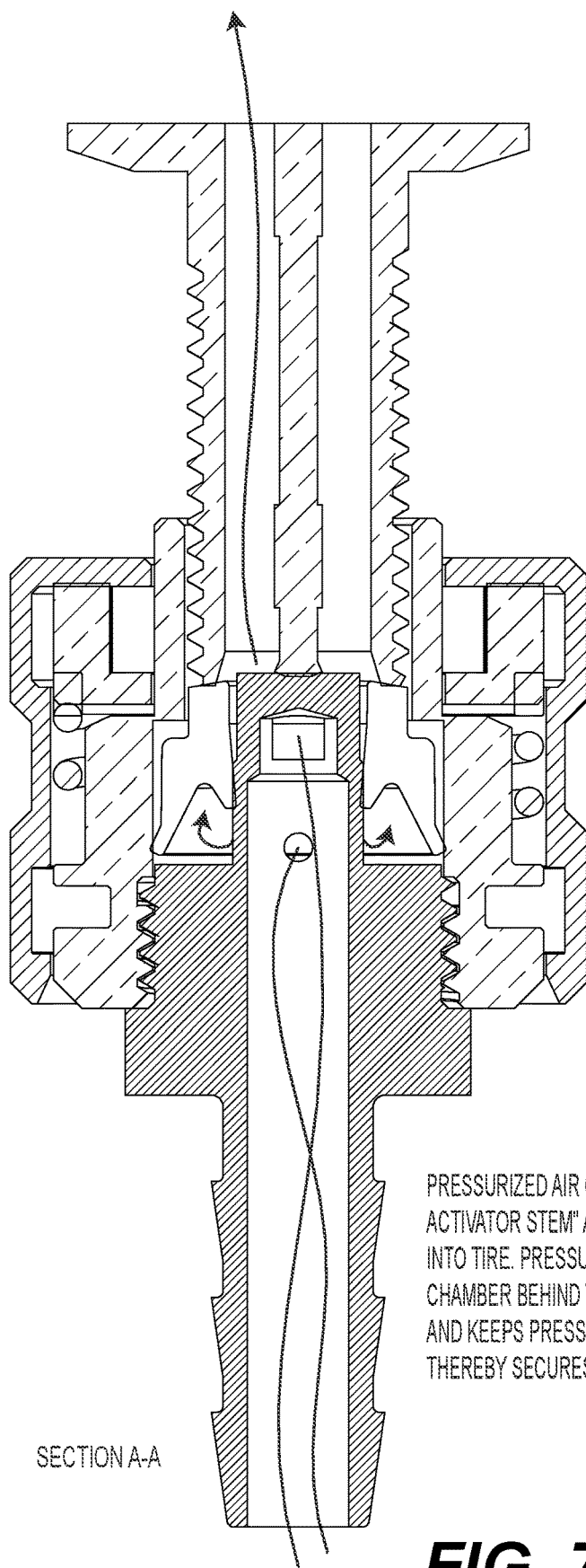

In FIG. 7 is illustrated a cross-section through an embodiment of the invention. Like features are provided with like reference numbers as used above. Airflow is indicated by the arrows "A".

The adapter 1 is in the figure attached to a valve 50'. The type of valve 50' is commonly used for car tires. The valve 50' is inserted in the open cavity 5 (see FIG. 1) and is brought into sealing engagement with the engagement surface 12 of the gasket 11. As the gasket 11 is engaged during insertion of the valve 50', pressurized air "A" will be released into the cavity 13. This air pressure will urge the gasket 11 into contact with the distal end (rim) of the valve 50', creating an airtight connection. At the same time the gasket 11 may move towards the valve and/or be pushed back by the engagement of the valve. Also at the same time the gas outlet 6 is opened allowing pressurized air (gas) to flow through the valve 50'. Therefore the special design of the gasket 11 provides that the gasket when delimiting the cavity 13 is forced upwards in the fig, and the lips 14,15 of the gasket are forced outwards into (sealing) contact with the valves housing 2. At the same time the upper surface of the gasket 11 is urged into sealing contact with the valves rim.

In this particular embodiment the means for engaging and holding the valve stem 50' are not present.

The invention claimed is:

1. Adapter suitable to connect a device for allowing compressed gas to pass through the adapter into an inflatable member, wherein the adapter comprises means for attaching the adapter to a source of compressed gas, said means for attaching the adapter having a gas passage, and where the means for attaching the adapter is in gas communication with a main housing, where the main housing has an inner first cavity comprising an open end, the first cavity suitable to receive a valve body of the inflatable member, a gas outlet disposed inside said first cavity, means for releasably holding the valve body of the inflatable member, and a resilient gasket is disposed between the main housing and the gas passage near the gas outlet, the gasket comprising a first end facing the open end of the first cavity and comprising an engagement surface configured to engage the valve body of the inflatable member when the valve body of the inflatable member is inserted into the first cavity, the gasket is engaged and abuts the valve body of the inflatable member; the gasket further comprising a lower section disposed opposite the engagement surface and comprising an inner lip and an outer lip, where said inner lip is in sealing and sliding engagement with the gas passage and the outer lip is in sealing and sliding engagement with the main housing, wherein the inner lip and outer lip, when engaged, form a substantially gas-tight third cavity, and where a housing shoulder is provided inside said first cavity, where the first cavity in a first cross-section perpendicular to the gas passage through the housing shoulder has a smaller cross-sectional area than in a second cross-section adjacent the housing shoulder such that the housing shoulder limits the movement of the gasket, and where the gas passage has a gas connection to the substantially gas tight third cavity provided between the lower section of the gasket and the main housing.

2. Adapter according to claim 1, wherein the means for releasably holding the valve body of the inflatable member comprises two rollers arranged in parallel, tangentially to the first cavity, on opposite sides and adjacent the open end of the first cavity, where said rollers are arranged in slits arranged at an oblique angle relative to the direction of the gas passage, allowing the rollers to move from an engagement position where the rollers in use are in engagement with the valve body of the inflatable member, to a retracted position wherein the rollers are substantially outside the circumference of the first cavity, and where the rollers are biased towards the engagement position by resilient means.

3. Adapter according to claim 2, wherein the rollers are provided with ridges substantially evenly spaced parallel to the longitudinal direction of the rollers on the periphery, said ridges spanning at least a major portion of the longitudinal extent of the rollers.

4. Adapter according to claim 2, wherein the rollers have a circular cross section, and the slits have an opening facing a gas passageway which is smaller than the diameter of the rollers.

5. Adapter according to claim 1, wherein the main housing is assembled from two or more metal parts, which parts are screwed, soldered or welded together.

6. Adapter according to claim 1, wherein an outer release ring is provided for controlling the position of the means for releasably holding the valve body of the inflatable member, where the release ring is arranged outside the main housing, slidable in the direction of the gas passage, where the release ring in a first end furthest away from the open end of the first cavity is provided with a lower flange angled towards the main housing.

7. Adapter according to claim 1, wherein the first cavity is suitable to receive a Presto® valve member.

8. Method comprising
connecting the adapter according to claim 1 to a source of pressurized gas by connecting the means for attaching the adapter to the source of compressed gas, such that the adapter is in gas communication with the main housing;

inserting the valve body of the inflatable member to be inflated into the first cavity of said main housing where in one end of the gasket towards the open end of the first cavity, where when the valve body of the inflatable member, is inserted into the first cavity the gasket is engaged and moved relative to the main housing such that the gasket will abut the valve body of the inflatable member.

9. Adapter suitable to connect a device for allowing compressed gas to pass through the adapter into an inflatable member, wherein the adapter comprises: means for attaching the adapter to a source of compressed gas, said means for attaching the adapter having a gas passage, and where the means for attaching the adapter is in gas communication with a main housing, where the main housing has an inner cavity comprising an open end, the cavity suitable to receive a valve body of the inflatable member, and where inside said cavity, a gas outlet is arranged, and further where means for releasably holding the valve body of the inflatable member is provided, and further a resilient gasket disposed between the main housing and the gas passage, near the gas outlet and provided with an engagement surface suitable for engagement of the valve body of the inflatable member, where when the valve body of the inflatable member is inserted into the cavity, the gasket is engaged, and the gasket is further moved relative to the main housing, such that the gasket will abut the valve body of the inflatable member; wherein the gasket is provided in the gas passage adjacent the gas outlet, where a groove is provided in an inner wall of the cavity, and the gasket has a first lip inserted and held in said groove, and a second lip spaced from said first lip, where said second lip can slide on the inner wall, such that as the valve body of the inflatable member is inserted into the cavity, the second lip will slide towards the first lip, thereby deforming the gasket, such that the gasket comes into sealing contact with the valve body of the inflatable member.

* * * * *